United States Patent [19]
Spohn

[11] 4,108,487
[45] Aug. 22, 1978

[54] SLEEPER STORAGE BINS

[76] Inventor: Larry L. Spohn, P.O. Box 54, Crescent, Iowa 51526

[21] Appl. No.: 783,850

[22] Filed: Apr. 1, 1977

[51] Int. Cl.² ............................................. B10P 3/34
[52] U.S. Cl. ...................................... 296/28 C; 5/118
[58] Field of Search ............... 296/28 C, 24 R, 23 R, 296/37 R; 5/118

[56] References Cited

U.S. PATENT DOCUMENTS

| 3,558,180 | 1/1971 | Algire | 291/28 C |
| 3,570,025 | 3/1971 | Sullivan | 5/118 |

*Primary Examiner*—Richard A. Bertsch

*Attorney, Agent, or Firm*—Clarence A. O'Brien; Harvey B. Jacobson

[57] ABSTRACT

Sleeper storage bins formed by a plurality of receptacles arrangeable immediately adjacent one another in a sleeper of a tractor cab. A plurality of lids are hinged to the receptacles for covering same, and are arranged for swinging in at least two different orientations substantially perpendicular to one another. When three receptacles are disposed in side-by-side relation within the sleeper, the center receptacle has the lid thereof pivotally mounted for swinging toward the back of the tractor cab, and the outside pair of receptacles has the lids thereof pivotally mounted for swinging away from one another. This arrangement of the lids permits selective access to the receptacles from the cab, with it being necessary to only open one of the receptacles at a time.

4 Claims, 6 Drawing Figures

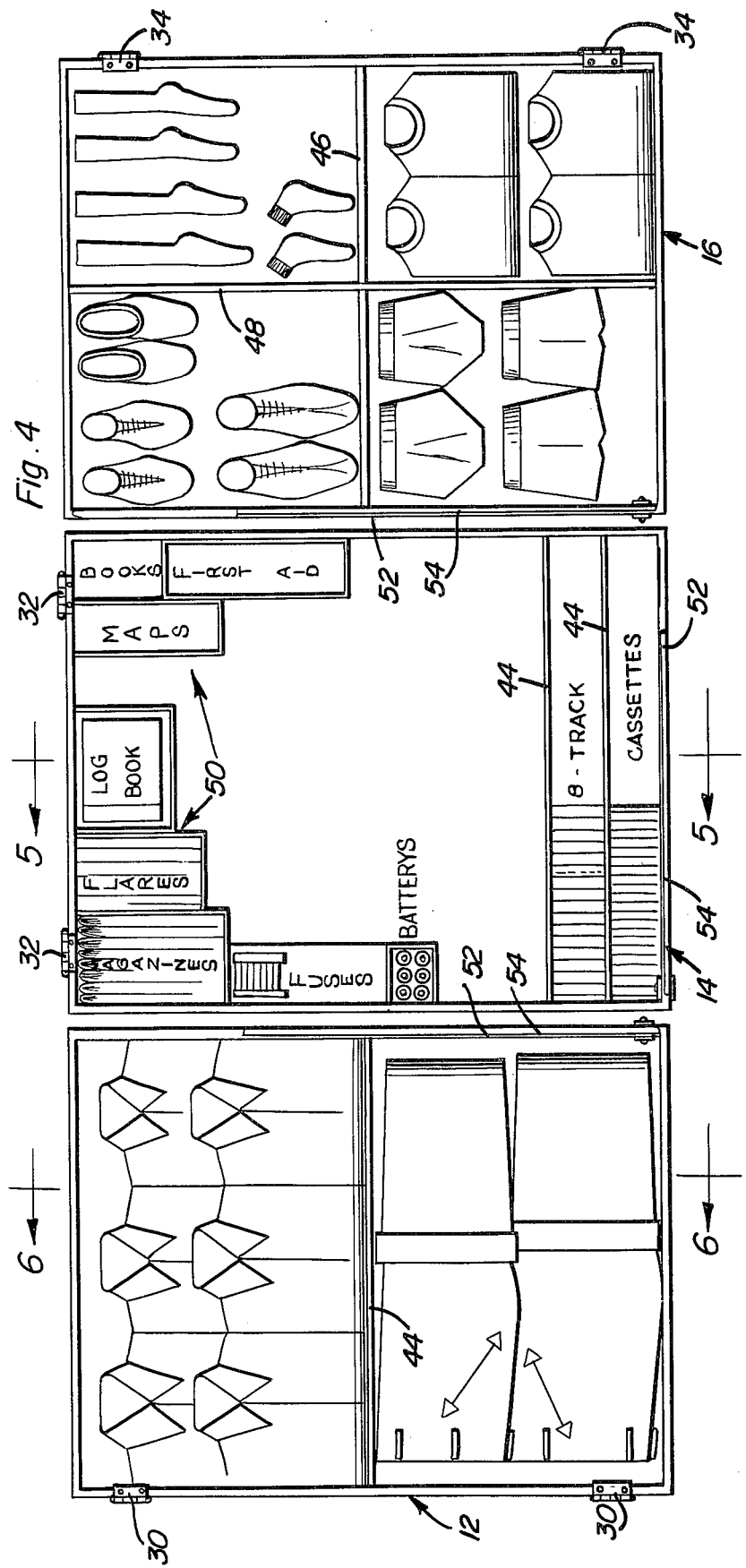

SLEEPER STORAGE BINS

BACKGROUND OF THE INVENTION

1. Field of the Invention

This invention relates generally to sleeping and storage units for vehicles, and particularly to storage bins to be arranged in the sleeper of a conventional tractor cab and cab over tractor cab.

2. Description of the Prior Art

Many large tractors used for towing semi-trailers are provided with a sleeping area generally referred to as a "sleeper" which permits a driver to sleep within the cab of the tractor during long hauls. Further, the truck drivers generally carry a great deal of personal effects and necessary equipment on such long trips, and problems occur for the driver inasmuch as the lack of considerable strorage facility for such items result in articles falling to the ground when the doors of the cab are open, or roll about in the cab and are damaged by movement of the truck. Or, when the windows are rolled down while driving, articles can start rolling about the interior of the cab, thus distracting the driver and causing a dangerous driving situation. In addition, when one is ready to sleep, it is necessary to clean out the sleeper and throw everything up to the front of the cab. Accordingly, it would be very practical and functional for any over-the-road driver who has sleeping quarters as a part of his vehicle to have storage containers for such articles arranged in the sleeping area. Such containers, however, tend to be inconvenient and difficult of access due to the usual position of a sleeper at the extreme rear of a tractor cab behind the driver's and other seats disposed in the cab.

Numerous devices have been proposed for providing sleeping and storage facilities within the interior of a vehicle. For example, U.S. Pat. Nos.: 3,570,025, issued Mar. 16, 1971, to P. F. Sullivan; 3,722,011, issued Mar. 27, 1973, to L. Miller; and 3,738,699, issued June 12, 1973, to R. P. Fain, disclose sleeping and storage units for small sedans and vans. Access to at least a portion of the storage compartments of the units disclosed in these prior patents is from the top of the storage compartments, but the construction of each of the sleeping and storage units is specifically intended for use in the interior of a small sedan or van, and is not at all adaptable for use in the sleeper of a tractor cab. In addition, U.S. Pat. Nos.: 2,692,009, issued Oct. 19, 1954, to M. H. Warshave, and 3,737,925, issued June 12, 1973, to J. A. Oxford, disclose beds which include storage compartments beneath the mattress portion of the beds. The arrangement of a single cover opening to one lateral side of these prior art beds, however, would make them rather inconvenient for use in the sleeper of a tractor cab due to the lack of flexibility as to suiting the storage unit to the very needs of a driver or team of drivers.

U.S. Pat. Nos. 3,558,180, issued Jan. 26, 1971, to D. E. Algire, discloses a bed attachment for tractor cabs wherein a sleeper is attached to the rear of an existing cab not provided with a sleeping area. While this bed attachment is provided with a storage compartment, this storage facility requires a specially constructed attachment and is not suitable for use with the sleepers conventionally provided in many tractor cabs.

SUMMARY OF THE INVENTION

It is an object of the present invention to provide storage bins specifically intended for use in the sleeper of a tractor cab.

It is another object of the invention to provide storage bins in which access is available to any one of a plurality of bins without bothering the other bins.

It is still another object of the present invention to provide storage bins for the sleeper of a tractor cab in which the bins can be employed in various combinations in order to permit the storage system to meet varying requirements of a driver or drivers of the vehicle, and to permit one or more of the bins to be completely replaced or exchanged with a bin from another vehicle, or even removed from the sleeper and the space used for another purpose.

These and other objects are achieved according to the present invention by providing sleeper storage bins having: a plurality of receptacles arrangeable immediately adjacent one another in a sleeper of a tractor cab; a plurality of lids for covering the receptacles; and hinges connected to the lids and receptacles for pivotally mounting the lids on respective ones of the receptacles, and for supporting a mattress arranged in the sleeper. The hinges pivotally mount the lids on the associated receptacles in two different orientations substantially perpendicular to one another. Where three receptacles are arrangeable in side-by-side relation in the sleeper, the center one of the receptacles has the lid thereof pivotally mounted for swinging toward a back or rear portion of the tractor cab, while the outside pair of receptacles have the lids thereof pivotally mounted for swinging away from one another. By this arrangement, selective access to the receptacles from the interior of the tractor cab is realized.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged, top plan view, similar to FIG. 2, but with the lids of the receptacles removed.

FIG. 5 is a sectional view taken generally along the line 5—5 of FIG. 4.

FIG. 6 is a sectional view taken generally along the line 6—6 of FIG. 4.

DESCRIPTION OF THE PREFERRED EMBODIMENTS

Figure 1:
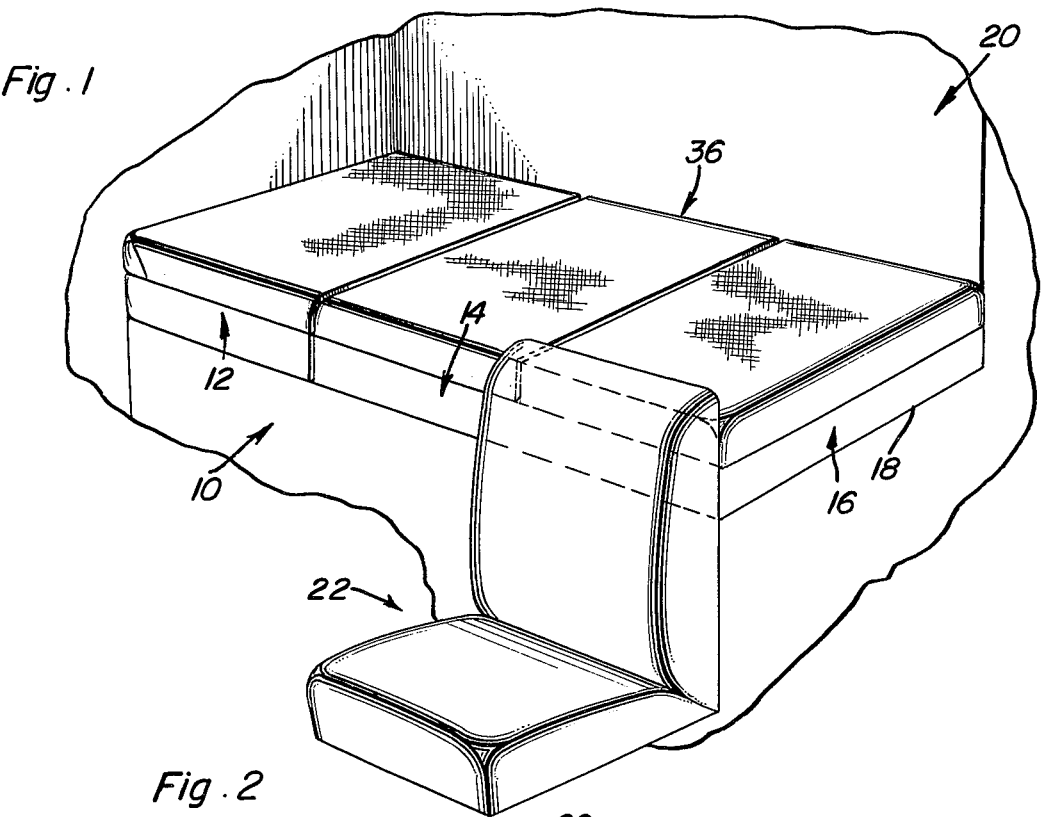
FIG. 1 is a fragmentary, perspective view showing storage bins according to the present invention arranged in the sleeper of a tractor cab.
Figure 2:
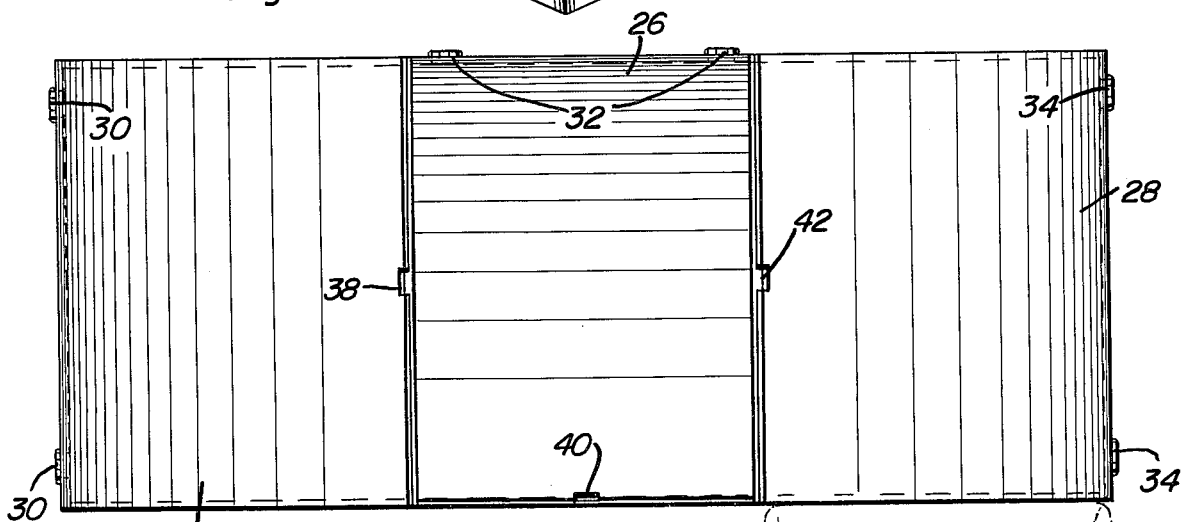
FIG. 2 is a top plan view showing sleeper storage bins according to the present invention.
Figure 3:
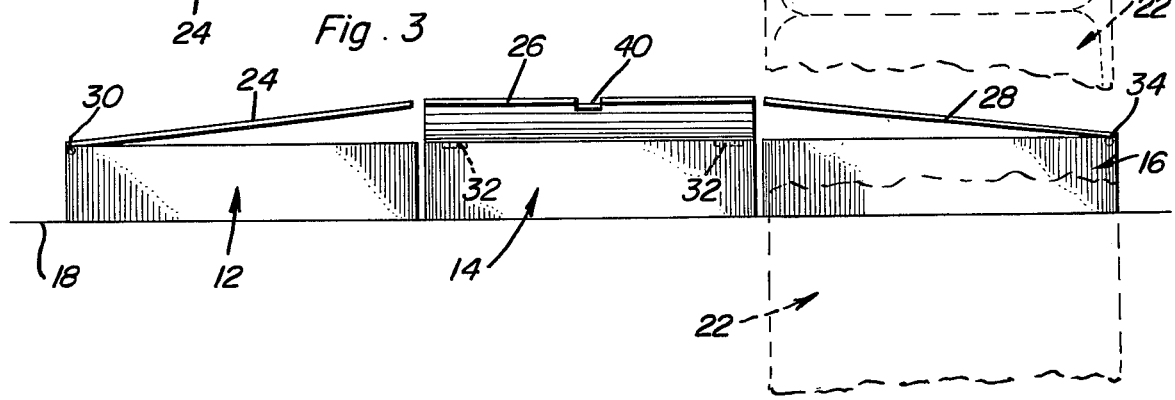
FIG. 3 is a front elevational view showing the sleeper storage bins of FIG. 2, but with the lids of the receptacles illustrated in slightly raised position so as to show the relative swinging movements of the lids with respect to one another.

Referring now more particularly to the figures of the drawings, sleeper storage bins 10 according to the present invention are specifically shown as an arrangement of three receptacles 12, 14, and 16 disposed immediately adjacent one anther in a sleeper 18 of a conventional tractor cab 20. A driver's seat 22 is shown in FIGS. 1, 2, and 3 of the drawings for illustrating the relationship of sleeper 18 and bins 10, with respect to the seats of cab 20. As will become clear below, when the bins 10 are formed by the illustrated three receptacles 12, 14, and 16, the receptacles 12 and 16 can be identical in external construction, only being arranged 180° with respect to one another, and the receptacle 14 will be of an external construction different from the receptacles 12 and 16.

A plurality of lids 24, 26, and 28 cover receptacles 12, 14, and 16, respectively, and swing relative to their associated receptacles as by conventional hinges 30, 32, and 34, respectively. Hinges 30, 32, and 34 pivotally mount their associated lids 24, 26, and 28 on their respective receptacles in two different orientations substantially perpendicular to one another. In other words, as mentioned above, there are basically two different receptacles illustrated in the present drawings, namely, receptacles 12, 16 and receptacle 14. The latter has the lid 26 thereof pivotally mounted by hinges 32 for swinging toward a back of cab 20, or away from seat 22, while the outside pair of receptacles 12 and 16 have their respective lids 24 and 28 thereof pivotally mounted for swinging away from one another and permitting selective access to the receptacles from the cab 20.

Lids 24, 26, and 28 support a conventional mattress 36 on which a driver (not shown), and the like, may sleep. Further, lids 24, 26, and 28 are provided with respective recesses 38, 40, and 42 adjacent the edge thereof spaced from and substantially parallel to the edge on which the associated hinges 30, 32, and 34 are disposed in order to form handles facilitating raising and lowering of the lids 24, 26, and 28 relative to their associated receptacles 12, 14, and 16.

Each of the receptacles 12, 14, and 16 and their associated lids 24, 26, and 28 has a rectangular configuration in plan, although it is to be understood that the configuration may vary from that shown in the drawings. Nevertheless, it is desirable to provide only two different receptacles, such as the illustrated receptacles 12, 16 and 14, so as to provide a modular system permitting full flexibility in the use of the units forming the system.

As can best be seen from FIGS. 4 through 6 of the drawings, dividers, such as those designated 44, 46, and 48, are advantageously arranged within the receptacles 12, 14, and 16 in a conventional manner, such as by the use of pins and associated apertures or by grooves receiving the dividers, for sectioning the associated receptacles 12, 14, and 16 into a plurality of article receiving compartments. Further, containers of various sizes, which are generally designated 50, can also be provided for holding special articles, such as flashlight batteries.

A groove 52 is shown along one edge of each of the receptacles 12, 14, and 16 for receiving an associated rod 54 when the latter is not in use. These rods 54 can be employed for holding open the associated lids 24, 26 and 28 when access to the corresponding receptacle 12, 14, and 16 is desired. Further, the grooves 52 can be used to hold pencils, pens, and even spare change for phones and tolls.

The bin formed by receptacle 14 is preferably laid out so as to form the basic unit of the storage system. The bins formed by receptacles 12 and 16 will fit on either side of receptacle 14 because of the manner in which the hinges 30 and 34 are arranged on the receptacles 12 and 16. More specifically, the hinging of the receptacles 12 and 16 makes it easier to open lids 24 and 28 when they are disposed on either side of the receptacle 14 because of the interference with access to the outer or side receptacles by the conventional sleeper curtain (not shown). The bins 10 can be used on all tractor cabs that have sleepers, and would be placed on the floor of sleeper 18 with individual padding on the lids 24, 26, and 28 of each bin 10, such padding forming mattress 36. In this way, any of the bins 10 can be opened without having interference from any other of the bins 10.

Bins 10 are adaptable for a two-man operation, as well as for a one-man truck. Bin 14 could be used for a one-man truck, with a receptacle 12, 16 being added when there is a second man, and a third receptacle 16, 12 being employed to carry the equipment and items necessary and common for operation of the truck.

Construction of the bins 10 can be of, for example, a suitable molded polymeric resin, with the hinges 30, 32, and 34, as well as the dividers 44, 46, and 48 also being made of a molded synthetic material. In this manner, they would light-weight, strong, and dust-resistant. The sleeping pad or mattress 36 could be constructed of foam rubber and laid on top of the sleeper bins 10 to the proper thickness to accommodate the weight necessary for the individual driver. The bins 10 could also be constructed in a conventional manner from wood, metal, and the like.

When the illustrated arrangement of three bins 10 is employed, access is available to any of the bins 10 without bothering the other two bins, which facilitates the opening, closing and cleaning of the bins. Further, the changing of combinations of the bins is also facilitated, with it being possible to completely replace or exchange one of the bins with a bin in another vehicle, and to simply remove a bin and use the space vacated for any other purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Sleeper storage bins, comprising, in combination:
   (a) a plurality of receptacles arrangeable immediately adjacent one another in a sleeper of a tractor cab;
   (b) a plurality of lids for covering the receptacles; and
   (c) hinge means connected to the lids and receptacles for pivotally mounting the lids on respective ones of the receptacles, and for supporting a mattress arranged in the sleeper, the hinge means pivotally mounting the lids on the receptacles in two different orientations for swinging movement substantially perpendicular to one another, three receptacles being arrangeable in side-by-side relation in the sleeper, with a center one of the receptacles having the lid thereof pivotally mounted for swinging toward the back of the cab, and an outside pair of the receptacles having the lids thereof pivotally mounted for swinging away from one another, the arrangement of lids permitting selective access to the receptacles from the interior of the cab.

2. A structure as defined in claim 1, wherein each of the receptacles and lids has a rectangular configuration in plan, and further including a divider member arranged in one of the receptacles for sectioning the receptacle into a plurality of compartments.

3. In combination, a tractor cab provided with a sleeper, and storage bins arranged in the sleeper for storing articles, the storage bins comprising, in combination:
  (a) a plurality of receptacles arranged immediately adjacent one another in the sleeper of the tractor cab;
  (b) a plurality of lids for covering the receptacles; and
  (c) hinge means connected to the lids and receptacles for pivotally mounting the lids on respective ones of the receptacles, and for supporting a mattress arranged in the sleeper, the hinge means pivotally mounts the lids on the receptacles in two different orientations for swinging movement substantially perpendicular to one another, three receptacles being arranged in side-by-side relation in the sleeper, with a center one of the receptacles having the lid thereof pivotally mounted for swinging toward the back of the cab, and an outside pair of the receptacles having the lids thereof pivotally mounted for swinging away from one another, the arrangement of lids permitting selective access to the receptacles from the interior of the cab.

4. A structure as defined in claim 3, wherein each of the receptacles and lids has a rectangular configuration in plan, and further including a divider member arranged in one of the receptacles for sectioning the receptacle into a plurality of compartments.

* * * * *